Nov. 5, 1963

J. B. JAMES 3,110,018

DATA STORAGE DEVICES

Filed Sept. 29, 1959

INVENTOR
JOHN BERNARD JAMES
BY Hane and Nydick
ATTORNEYS

United States Patent Office 3,110,018 Patented Nov. 5, 1963

3,110,018
DATA STORAGE DEVICES

John Bernard James, Stevenage, England, assignor to International Computers and Tabulators Limited (formerly The British Tabulating Machine Company Limited)

Filed Sept. 29, 1959, Ser. No. 843,177
Claims priority, application Great Britain Oct. 8, 1958
7 Claims. (Cl. 340—174)

Figures 1, 2, 3, 4, 5:
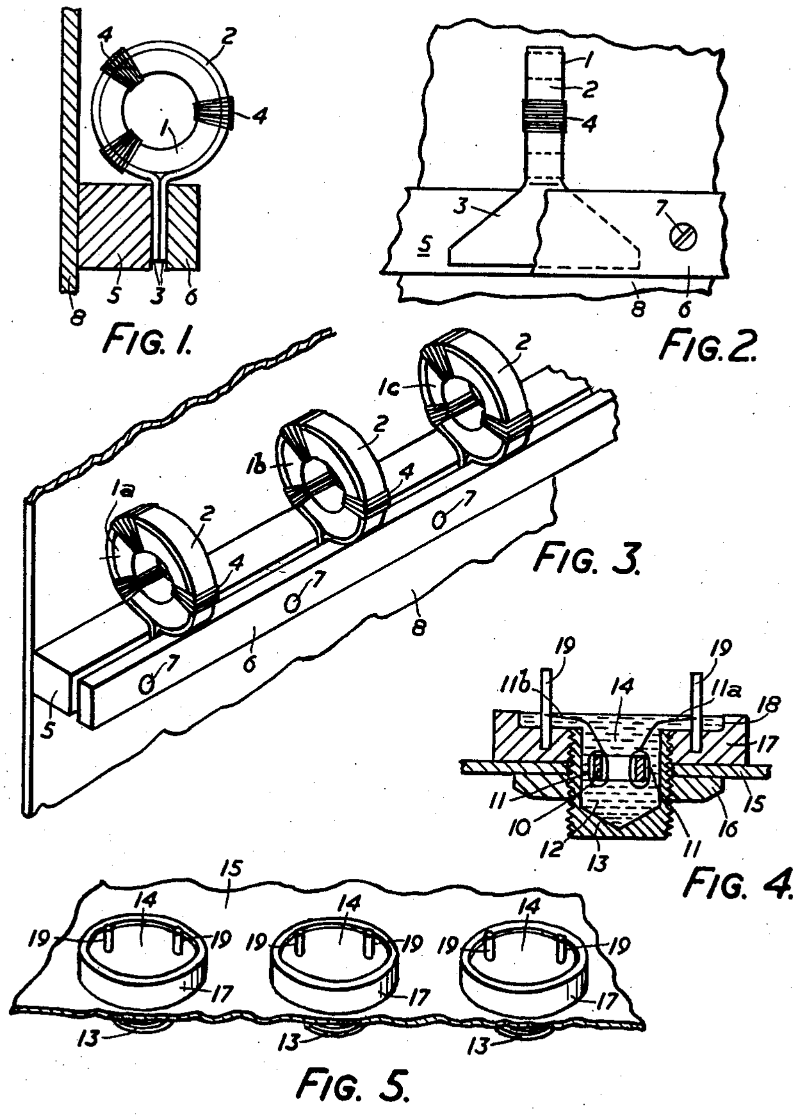

The present invention relates to apparatus which includes one or more magnetic cores of a ferrite material. The cores may for example form part of a magnetic core storage device or of a magnetic core switching device.

The use of magnetic cores of ferrite material in core storage and switching devices is well known, the cores usually being annular in form. The ferrite materials used have what is referred to as a substantially rectangular hysteresis characteristic and the cores consequently have two stable states of magnetic saturation, between which they may be switched by causing electric currents of suitable amplitude and polarity to flow in windings linked with the cores. It is this bi-stable property of ferrite cores which is utilised in their application to storage and switching devices. Such devices themselves find application in, for example, digital computers and calculators.

Where the application of the cores requires that they shall be switched between their stable states either continuously at a relatively high rate or intermittently at a relatively high average rate, difficulties arise and it is found that there is in fact an upper limit to the switching frequency at which ferrite cores can usefully be operated owing to a deterioration of their magnetic characteristics. One of the factors which gives rise to this limiting condition is the heating of the cores due to hysteresis losses occurring as the cores are switched. This heating increases as the switching frequency increases. In larger cores, too, that are employed to generate impulses for switching a plurality of smaller cores, the heavier currents involves aggravate the problem.

It is an object of the present invention to provide apparatus which includes magnetic cores of ferrite material, the cores being arranged so that they can be operated at higher switching frequencies than would normally be the case.

According to the present invention apparatus which includes a magnetic core of ferrite material having a substantially rectangular hysteresis characteristic and provided with at least one winding for the passage of electric currents to enable it to be switched between its two stable states of magnetic saturation, also includes a member or structure capable of acting in operation of the apparatus as a heat sink for heat generated in the core and means providing a solid path for the conduction of heat between the core and the heat sink whereby deterioration of the magnetic characteristics of the core due to heating caused by hysteresis losses on switching is reduced.

In one construction, in a case in which the core is an annular one, the heat conducting path may be provided by a metal band which encircles the core and is in contact with its outer circumference, one or both ends of the band, or metallic members secured thereto, projecting outwards from the core and being secured in good thermal contact with the heat sink, and the winding or windings provided for the core being wound around the core and the metal band. The band is preferably of copper, brass, or aluminium and must in any case be thick enough to allow of sufficiently rapid transfer of heat from the core to the heat sink. Where a plurality of cores are provided in a single apparatus, each may be encircled by a metal band in this manner, the bands being secured to a common heat sink.

In another construction, the core is mounted within a cavity in a metallic member, being held in position by solidified "potting" material so that the spacing of the core from the walls of the cavity is small compared with the core dimensions, and the metallic member is secured in good thermal contact with the heat sink. Thus, the core may be mounted in an axial cavity in a brass stud which is secured in good thermal contact with a metal plate forming at least part of the heat sink. A plurality of such studs may be secured to a single plate.

Examples of apparatus according to the present invention will now be described with reference to the accompanying drawing in which:

FIGURES 1 and 2 show front and side elevations respectively of a core and its mounting, forming part of one apparatus, FIGURE 3 shows a perspective view of part of apparatus including a plurality of cores having mountings as shown in FIGURES 1 and 2, FIGURE 4 shows a section through another apparatus showing a single core and its mounting, and FIGURE 5 shows a perspective view of a part of apparatus including a plurality of cores mounted as shown in FIGURE 4.

Referring first to FIGURES 1 and 2 of the accompanying drawing, there is shown a magnetic core 1 of the usual annular form and constructed of ferrite material having a substantially rectangular hysteresis characteristic. The outer circumference of the core 1 is enriched by a band 2 of copper, the ends of which project outwards from the core 1 in contact with another and are flared to form fins 3. In applying the band 2, it is drawn tightly round the core 1 so as to be in good thermal contact with it. The core 1 is provided with windings 4 in known manner, except that they are wound on after the application of the band 2, and encircle the band 2 as well as the core 1. Three separate windings 4 are shown, but it will be appreciated that the number and extent of the windings provided may be varied at will.

The fins 3 are clamped between a metal bar 5 and a strip 6 by means of screws 7 (of which only one is shown), the bar 5 being of copper or other metal or materials of high thermal conductivity and having a heat capacity such as to be able to act in operation as a heat sink for heat generated in the core 1. The bar 5 is secured to a plate 8 forming part of the framework of the apparatus of which it forms part, being secured to it for example by welding or by screws.

The strip 6 may be of metal in which case it will form part of the heat sink, or of non-metal. It may, of course, also be omitted, the fins 3 then being secured directly to the surface of the bar 5 by screws or other means. In addition, the plate 8 need not be vertical, for example the undersides (as shown in FIGURES 1 and 2) of the bar 5 and the strip 6 may lie in contact with a horizontal plate, nor need the bar 5 be in contact with a plate 8 along the whole of its length. It may, for example, be secured to a different plate or other member at each end. Further, the fins 3 may be bent at right angles to form feet which can be screwed or otherwise secured to the upper surface of a horizontal plate forming a heat sink.

FIGURE 3 shows a perspective view of three cores 1*a*, 1*b* and 1*c* mounted together in an apparatus according to the invention, the fins 3 of the bands 2 in each case being clamped between the same bar 5 and strip 6. It will be appreciated that any number of cores 1 may be included in a single apparatus, each of them being mounted in thermally-conducting contact with a member or structure capable of acting as a heat sink.

As, in the apparatus just described, the width of the band 2 is made approximately equal to that of the core 1, in order not to interfere unduly with the shape of the windings 4, the thickness of the band must be determined in individual cases to allow sufficient conduction of heat away from the core 1 in operation. Preferably a good conductor of heat such as copper or brass is used, so that the minimum thickness of metal can be used, but other metals may be substituted provided they do not have magnetic properties which would affect the operation of the core 1.

As long as the band 2 does not at any point form a short-circuited turn around the core 1, it may be arranged to contact other faces of the core 1 than the outer circumference. In particular it may have flanges bent over to contact the side faces of the core 1. If, as may occur, it is required to use a similar construction in a case where the windings 4 have already been wound on to the core 1, copper clamps may be attached to the core 1 between the windings 4, each clamp being designed to make initimate contact with as great an area of the core surface as possible, without of course forming a complete short-circuited turn. Each clamp is secured in thermal contact with a heat sink, for example a metal plate.

It will be appreciated that these arrangements not only provide for cooling of the core 1 but also provide a convenient mounting for it. It has been found that cores mounted in this way may be operated to switch at increased repetition frequencies as compared with the same cores mounted in conventional manner. For example a 4 mm. diameter core of a kind commercially available has been found to show measurable changes in its magnetic characteristics when operated at a pulse repetition frequency of about 25 kc./s. and under predetermined test conditions was found to have an upper usable frequency limit of approximately 50 kc./s., the magnetic characteristics deteriorating above that frequency to such an extent that proper operation of the core could not take place. After fitting a copper band 0.007 of an inch in thickness, thermally connected to an efficient heat sink, the core could be used under the same test conditions up to an upper limit of about 500 kc./s., the deterioration of the magnetic characteristics due to heating caused by hysteresis losses on switching at frequencies in the range 50–500 kc./s. having been sufficiently reduced to enable operation at these higher frequencies. Thus, the maximum useful operating frequency was increased by a factor ten. Adverse effects due to the presence of eddy currents in the copper were found to be very small.

The increase in the maximum operating frequency is secured by reducing the temperature rise in the core, which is produced by the hysteresis losses. The increase which is obtained in any particular case is therefore dependent on how efficiently the heat is conducted away from all parts of the core. As the size of the core is increased, less of the total core volume is near to the thermally conductive band 2, so that heat transfer is less efficient. It was found, for example that the typical increase in the maximum operating frequency for a core of 13 mm. diameter was approximately twice as compared with ten times for the 4 mm. core. The increases, particularly in the case of the smaller cores, are much greater than can be obtained using only air cooling of the cores.

It will be appreciated that in apparatus having a large number of cores connected to a common heat sink, conventional arrangements for cooling the member or structure acting as the heat sink, for example by a forced air current, may be used.

FIGURE 4 shows a section through part of another apparatus according to the invention, in which the cores are mounted rather differently from the manner shown in FIGURES 1 and 2. FIGURE 4 shows only a part of the apparatus, that part including a single annular core 10 and the section of FIGURE 4 being in a plane containing the axis of the core 10. The core 10 is provided with windings as required for its operations, one of these, a winding 11 having input leads 11*a* and 11*b* being indicated only diagrammatically in FIGURE 4.

The core 10 is held in position within a cavity 12 drilled in a brass stud 13 by means of a mass of "potting" medium 14 which, in known manner, is poured into the cavity 12 in molten form and allowed to set. The medium 14 may for example be a thermosetting resin material such as that known as "Araldite." The stud 13 has an external screw thread and passes through an aperture in a metal plate 15, being held in position by a brass nut 16 and a moulded plastic nut 17 screwed on to it on opposite sides of the plate 15. The diameter of the cavity 12 is made only slightly greater than the external diameter of the core 10 and its windings, so that the amount of "potting" medium between the core 10 and the internal walls of the stud 13 is kept as small as possible. The plastic nut 17 is shaped so that it contains a shallow depression 18 at its outer end, to facilitate the pouring of the "potting" medium 14, and also carries two brass connecting pins 19 to which the leads 11*a* and 11*b* are secured by soldering. The number of pins 19 required will of course be determined by the number of windings 11 on the core 10 and it will be understood that the two shown are by way of example only.

The "potting" medium 14 must be of sufficient thermal conductivity that the heat generated in the core 10 when operating at higher repetition frequencies, can be conducted through it to the stud 13 and thence to the plate 15 which acts as a heat sink in operation. For example, using the material known as "Araldite" as the "potting" medium, it has been found desirable to admix it with powdered aluminium or silica (the former is preferred from the point of view of thermal conductivity) in order to provide a sufficient rate of heat transfer from the core to the plate 15. As already mentioned, the diameter of the core 10 must be such that it lies close to the wall of the cavity 12, so that only a small amount of the medium 14 separates it from the stud 13.

As shown in FIGURE 5, it will be appreciated that a single plate 15 may carry a plurality of cores 10, each separately mounted within a stud 13. In addition, the form of the plate 15 and the stud 13 are unimportant as long as the cores 10 are held by the "potting" medium 14 sufficiently close to the walls of a cavity in a metallic structure or member capable of acting as a heat sink, or in good thermal contact with a heat sink.

It will also be appreciated that in any case where a large number of cores are in thermal contact with a common heat sink, arrangements may have to be made to cool the sink, for example by blowing cool air over it.

In these alternative constructions described with reference to FIGURES 4 and 5, increases in the maximum operating frequencies of various cores were obtained of the same order as with the construction shown in FIGURES 1–3.

In all cases, the heat sink may be a special member or structure provided within the apparatus, the member or structure having the necessary heat capacity and remaining in operation of the apparatus at sufficiently low temperature. Alternatively it may be possible to arrange that a part of the main framework of the apparatus which includes the core or cores, can act as the heat sink.

I claim:

1. A magnetic switch core assembly comprising, an annular magnetic core of a ferrite material which has a substantially rectangular hysteresis loop at room temperature and which suffers a substantial deterioration in magnetic properties as the temperature is increased; a plurality of single layer windings, each of which is wound on a different segment of the core, and to some of which high frequency impulses are applied to effect switching of the core; a relatively large volume of material having a high thermal capacity and thermal conductivity relative to the material of said core; and a relatively small volume of material in intimate contact with at least a major part of the periphery of said core and with each of said windings and being so formed that it supports the core in a fixed physical relationship with said large volume of material and provides a path of good thermal conductivity for the transfer of heat from the core and the windings to said large volume of material.

2. A magnetic switch core assembly comprising, an annular magnetic core of a ferrite material with a substantially rectangular hysteresis characteristic, the core having an outside diameter of not more than 13 mm.; a metal strip with a centre section in intimate contact with substantially the whole of the outer periphery of the core and end sections bent to extend outwardly from the periphery of the core; a plurality of single layer windings, each being wound over a section of the core and the strip; a mounting plate having a large thermal capacity relative to that of the core; and clamping means attached to said mounting plate and effective to grip said end sections of the strip to support the core in a fixed relationship with the mounting plate and to provide a path of good thermal conductivity for transferring heat from the core and the windings to the mounting plate.

3. A magnetic switch core assembly comprising a core container in the form of a hollow metallic cylinder with a closed end, and which is screw-threaded on the outside cylinderical surface thereof; an annular magnetic core of ferrite material with a substantially rectangular hysteresis characteristic positioned within said container; a plurality of single layer windings on the core; a filling of hardened plastic material filling the container and supporting the core spaced away from the walls of the container; a threaded metallic nut engaged with part of the threaded portion of the container; a metallic mounting plate having a large thermal capacity relative to that of the core; and means for resiliently clamping said nut in contact with the mounting plate to thereby secure the container to the mounting plate and to provide a path of good thermal conductivity for the transfer of heat from the core and windings to the mounting plate.

4. A magnetic switch core unit consisting of an annular magnetic switch core of ferrite material; at least one single layer winding wound on the core; a metallic container for the core, the container having the form of a hollow cylinder with one open end and one closed end; a ring-like member of resilient plastic material positioned on said cylinder adjacent to the open end; electrical terminals mounted in the ring-like member and extending outwardly from the surface thereof; electrical connections from the winding to the terminals; and a filling of hardened plastic material surrounding the core, the winding and the electrical connections thereto, and serving to secure the core within said cylinder, spaced from the wall thereof, and to provide a thermally conductive path for transferring heat from the core to the cylinder.

5. A magnetic switch core unit according to claim 4, in which the hardened plastic material contains powdered aluminum substantially uniformly distributed therethrough to increase the thermal conductivity.

6. A magnetic switch core unit according to claim 4 in which the hardened plastic material contains powered silica to increase the thermal conductivity of the material.

7. A magnetic switch core assembly comprising a metallic mounting plate with an aperture therein; a metallic switch core container passing through the aperture; a nut of plastic material engaged with the container and adjacent to one end thereof; a metallic nut engaged with the container, the two nuts being on opposite sides of the mounting plate and serving to clamp the container within the aperture; a magnetic switch core of ferrite material embedded in hardened plastic material and secured thereby in a hollow in the container; a pair of terminals secured in, and extending outwardly from the surface of, said plastic unit; and a switching winding on the core, each end of the winding being electrically connected to one of said terminals.

References Cited in the file of this patent

UNITED STATES PATENTS

| | | |
|---|---|---|
| 1,602,043 | Pfiffner | Oct. 5, 1926 |
| 1,680,910 | Pfiffner | Aug. 14, 1928 |
| 2,756,375 | Peck | July 24, 1956 |
| 2,788,499 | Pappas | Apr. 9, 1957 |
| 2,805,275 | Bussing | Sept. 3, 1957 |
| 2,819,444 | Walker | Jan. 7, 1958 |
| 2,882,505 | Feder | Apr. 14, 1959 |
| 2,895,093 | Kodama | July 14, 1959 |
| 2,914,600 | Smith | Nov. 24, 1959 |